US011456937B2

(12) United States Patent
Iglesias et al.

(10) Patent No.: US 11,456,937 B2
(45) Date of Patent: *Sep. 27, 2022

(54) SYSTEMS AND METHODS FOR HIGH AVAILABILITY AND PERFORMANCE PRESERVATION FOR GROUPS OF NETWORK FUNCTIONS

(71) Applicant: Verizon Patent and Licensing Inc., Basking Ridge, NJ (US)

(72) Inventors: Raul Buendia Iglesias, Highland Village, TX (US); Raymond Patrick, Washington, NJ (US); Sudhakar Reddy Patil, Westlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/372,946

(22) Filed: Jul. 12, 2021

(65) Prior Publication Data
US 2022/0166695 A1   May 26, 2022

Related U.S. Application Data

(63) Continuation of application No. 17/101,791, filed on Nov. 23, 2020, now Pat. No. 11,095,543.

(51) Int. Cl.
*G06F 15/16* (2006.01)
*H04L 43/0817* (2022.01)
*H04L 41/0893* (2022.01)
*H04L 41/06* (2022.01)
(Continued)

(52) U.S. Cl.
CPC .......... *H04L 43/0817* (2013.01); *H04L 41/06* (2013.01); *H04L 41/0893* (2013.01); *H04L 67/10* (2013.01); *H04L 67/56* (2022.05)

(58) Field of Classification Search
CPC . H04L 43/0817; H04L 41/06; H04L 41/0893; H04L 67/28; H04L 67/10
See application file for complete search history.

(56) References Cited

U.S. PATENT DOCUMENTS 6,169,724 B1 * 1/2001 Begum ................... H04M 3/32
                                                                        340/3.7
9,645,899 B1 * 5/2017 Felstaine ............. G06F 11/1451
(Continued)

*Primary Examiner* — Padma Mundur

(57) ABSTRACT

A system described herein may provide a technique for the proactive failover of groups of Virtualized Network Functions ("VNFs") based on monitoring Key Performance Indicators ("KPIs") associated with the VNFs. KPIs associated with a particular VNF or a set of VNFs may be monitored, and a failover event indicating service degradation or imminent service degradation may be detected based on the KPIs associated with the particular VNF or set of VNFs. Additional VNFs, associated with the particular VNF or set of VNFs, may be further identified for failover from a first data center to a second data center. The additional VNFs may be identified for failover without necessarily monitoring KPIs associated with the additional VNFs, and/or based on factors in addition to KPIs associated with the additional VNFs. For example, the additional VNFs may be failed over based on the KPIs associated with the particular VNF or set of VNFs.

20 Claims, 12 Drawing Sheets

(51) Int. Cl.
  *H04L 67/10* (2022.01)
  *H04L 67/56* (2022.01)

(56) References Cited

U.S. PATENT DOCUMENTS

| | | | |
|---|---|---|---|
| 2009/0103518 A1* | 4/2009 | Yu | H04L 12/66 |
| | | | 370/352 |
| 2016/0277509 A1* | 9/2016 | Qiang | H04L 67/16 |
| 2019/0149397 A1* | 5/2019 | Celozzi | H04L 41/0686 |
| | | | 370/228 |

* cited by examiner

SYSTEMS AND METHODS FOR HIGH AVAILABILITY AND PERFORMANCE PRESERVATION FOR GROUPS OF NETWORK FUNCTIONS

CROSS-REFERENCE TO RELATED APPLICATION

This Application is a Continuation of U.S. patent application Ser. No. 17/101,791, filed on Nov. 23, 2020, titled "SYSTEMS AND METHODS FOR HIGH AVAILABILITY AND PERFORMANCE PRESERVATION FOR GROUPS OF NETWORK FUNCTIONS," the contents of which are herein incorporated by reference in their entirety.

BACKGROUND

Wireless networks, such as Long-Term Evolution ("LTE") networks, Fifth Generation ("5G") networks, and/or other types of networks may be implemented via network functions that may perform various operations associated with such networks, such as authorizing or authenticating User Equipment ("UEs"), setting up calls or other types of sessions, etc. Some wireless networks may make use of Virtualized Network Functions ("VNFs"), in which virtual machines, containers, or the like perform such network functionality. Multiple VNFs may be implemented by one physical machine or set of physical machines, which may be co-located (e.g., located at a physical site or data center).

DETAILED DESCRIPTION OF EXAMPLE EMBODIMENTS

The following detailed description refers to the accompanying drawings. The same reference numbers in different drawings may identify the same or similar elements.

Embodiments described herein provide for the proactive failover of sets of virtual machines, containerized processes, VNFs, etc. based on metrics, Key Performance Indicators ("KPIs"), or the like associated with one or more VNFs, virtual machines, containerized processes, etc. (referred to herein simply as "VNFs" for brevity). For example, KPIs or other metrics associated with one VNF may indicate the likelihood or probability of a performance degradation, service interruption, or other type of event associated with multiple other VNFs, even if the other VNFs themselves do not exhibit KPIs or other metrics (referred to herein simply as "KPIs" for brevity) indicating that such other VNFs are experiencing such degradation, interruption, etc. Further, certain VNFs may have relationships, pre-defined interfaces or protocols, Service Level Agreements ("SLAs"), or other types of constraints which may be negatively impacted or violated by failing over one VNF without failing over other VNFs that have such relationships, SLAs, etc. with the VNF.

For example, failing over a VNF with degraded or degrading KPIs (e.g., KPIs that fall below a threshold level of performance, and/or KPIs that approach the threshold level) from one data center to another may increase latency of communications between the VNF and other VNFs. Such increase in latency may cascade and result in overall reduced end-to-end performance, such as increased latency of communications between UEs or other devices that communicate via a wireless network that includes the VNF. For example, other VNFs may rely on information provided by the failed over VNF and may be required to wait until such communications are received before performing subsequent processing or operations.

As discussed herein, a "failover" (or "failing over") of a VNF may refer to the instantiation, provisioning, activation, etc. of the VNF at a different site, data center, server, facility, etc. than a current site, data center, server, facility, etc. (referred to herein simply as "data center" for brevity). The failover may also include de-instantiating, deprovisioning, deactivating, etc. the VNF from the data center that originally implemented, hosted, executed, etc. the VNF (e.g., immediately prior to the failover). The failover procedure may also include propagating the change to one or more other VNFs or network elements, such as routers, border controllers, Domain Name System ("DNS") servers, Dynamic Host Configuration Protocol ("DHCP") systems, or the like, such that the failed over VNF may continue to send and/or receive traffic with minimal or no interruption after the VNF has been failed over to another data center.

Figure 1:
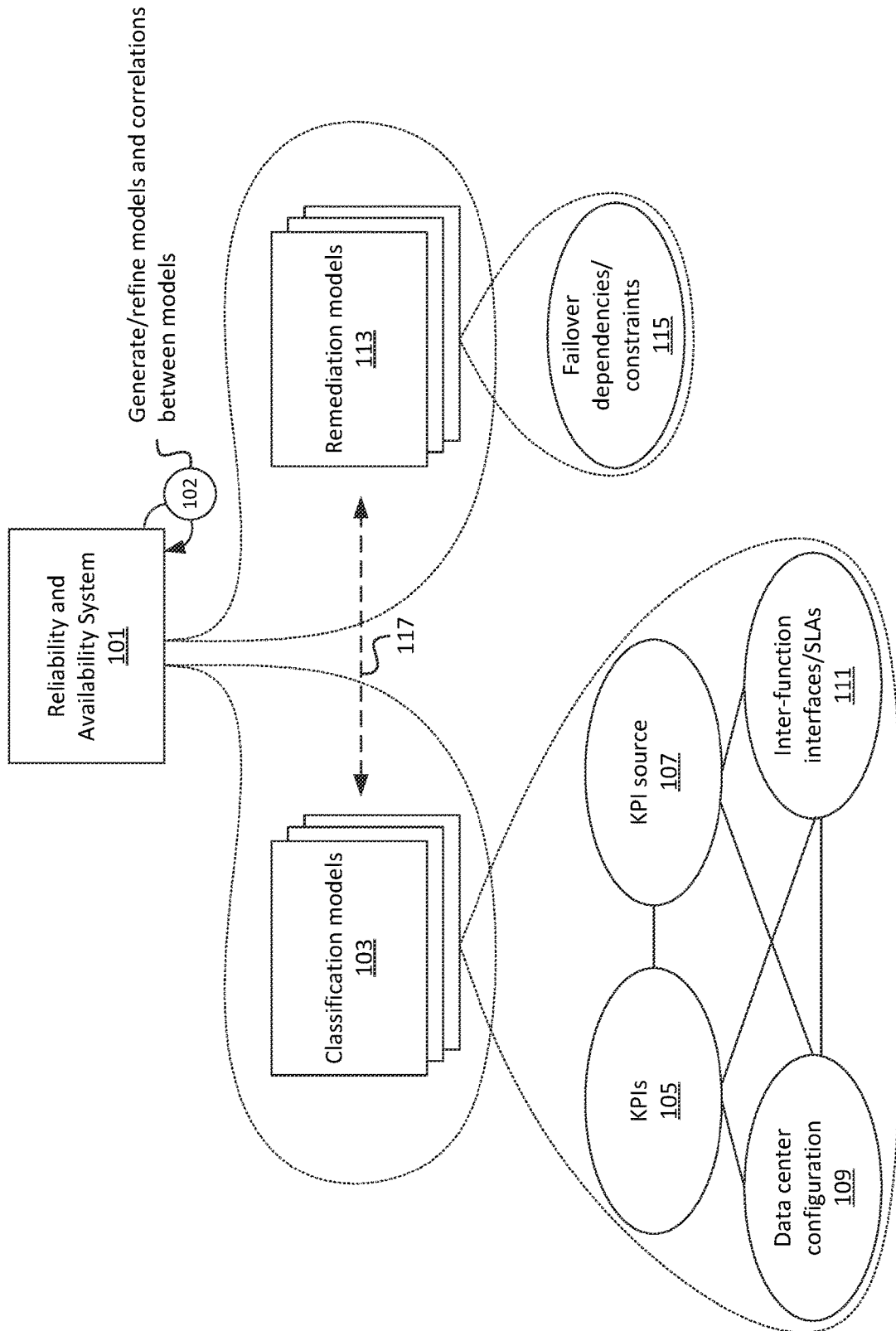
FIG. 1 illustrates an example of models that may be generated, maintained, and/or refined by a Reliability and Availability System ("RAS") of some embodiments, where such models may be used to identify sets of VNFs that should be failed over to different data centers when certain criteria are met.

As shown in FIG. 1, RAS 101 may receive, generate, and/or refine (at 102) one or more sets of models, and correlations between the models, based on which RAS 101 may identify failover conditions (e.g., based on KPIs associated with one or more VNFs) and effect a failover of a set of VNFs (e.g., including the one or more VNFs and/or other VNFs), in order to maintain high availability and performance of the VNFs. As shown, for example, RAS 101 may receive, generate, maintain, etc. a set of classification models 103. As discussed below, classification models 103 may be used to classify VNFs or sets of VNFs at one or more data centers, in order to determine failover conditions associated with the VNFs. As referred to herein, a "failover condition" may refer to a condition, set of conditions, criteria, or the like, that indicate that a VNF should be failed over from one data center to another. Such failover conditions may include, for example, threshold values associated with one or more particular KPIs or metrics, such as a maximum latency threshold, a minimum throughput threshold, a maximum call failure rate threshold, a minimum call success rate threshold, and/or other suitable types of values, metrics, KPIs, etc.

Further, as discussed below, classification models 103 may be correlated (at 117) with one or more remediation models 113, which may indicate how such failover conditions should be handled. For example, as discussed below, one example correlation 117 of classification models 103 to remediation models 113 may indicate that if a particular VNF exhibits one or more KPIs below or approaching a given threshold value, then the particular VNF and one or more other VNFs (e.g., one or more other VNFs that do not necessarily exhibit degrading KPIs) should be failed over.

As shown, classification models 103 may include KPI information 105, KPI source information 107, data center configuration information 109, and/or inter-function interfaces/SLA information 111. In some embodiments, classification models 103 may include or may be based on additional, fewer, and/or different information. KPI information 105 may include, for example, threshold values for KPIs, performance metrics, or the like, which may indicate a degradation, service interruption, or other type of event indicating a potential need to fail over one or more VNFs. For example, KPI information 105 may include threshold values for latency (e.g., latency of traffic sent by a given VNF and/or latency of traffic sent to the VNF), processing and/or queue time (e.g., an amount of time the VNF takes to output or forward traffic that is based on received traffic), throughput, jitter, call failure rate (e.g., which may indicate a rate at which voice calls or other sessions are interrupted or disconnected without a "hang up" or other suitable instruction or command from a party involved in the call, and/or one or more other types of failures or errors), call success rate (e.g., which may indicate a rate at which voice calls or other sessions are completed successfully by way of a "hang up" or other suitable instruction or command), packet error and/or loss rate, Session Initiation Protocol ("SIP") error rate (e.g., a quantity of SIP error codes determined over a particular period of time for traffic associated with SIP-related communications such as voice call setup procedures), Diameter error rate (e.g., a quantity of Diameter protocol error codes determined over a particular period of time for traffic associated with Diameter-related communications), and/or other metrics.

In some embodiments, KPI information 105 may indicate threshold rates at which a given KPI is approaching a threshold. For example, KPI information 105 may indicate that if a particular KPI associated with a particular VNF, such as latency, is above 99 milliseconds ("ms"), then the VNF is experiencing a service degradation. KPI information 105 may further indicate that if the latency associated with the VNF is approaching 99 ms, then the VNF is likely to experience a service degradation. For example, if the latency associated with the VNF is 50 ms at a first time, 60 ms at a subsequent second time, and then 70 ms at a third time, this may indicate that the KPI is "approaching" the threshold level of 99 ms.

As noted above, the rate of "approach" of measured or observed KPI values, as compared to threshold KPI values, may be specified by KPI information 105 in some embodiments. For example, in the previous example, the rate of approach may be lower than a threshold rate of approach, in which situation the KPI may not be deemed as "approaching" the threshold level. For example, if the KPI is approaching the threshold level relatively slowly (e.g., slower than a particular rate), this may indicate that further time may be allowed to continue to monitor the KPI and ultimately determine if degradation is actually imminent. If, on the other hand, the KPI is rapidly approaching the threshold level (e.g., greater than the particular rate or some other rate), this may indicate that service degradation is imminent. Example aspects of the present disclosure include similar rate comparisons and thresholds for other KPIs.

Different KPI thresholds may be associated with different KPI sources 107. For example, as denoted by the line between KPI information 105 and KPI source information 107 in FIG. 1, a particular KPI may be associated with a first threshold when received from a first VNF, while a second KPI may be associated with a different second threshold when received from a different second VNF. For example, KPI information 105 and/or KPI source information 107 may indicate that when a call failure rate associated with an Interrogating Call Session Control Function ("I-CSCF") exceeds or approaches 10%, the I-CSCF is exhibiting or is approaching a service degradation or other failover condition. As another example, KPI information 105 and/or KPI source information 107 may indicate that when a call failure rate associated with a Telephony Application Server ("TAS") exceeds or approaches 15%, the TAS is exhibiting or is approaching a service degradation or other failover condition.

Data center configuration information 109 may indicate configurations of one or more data centers at which particular VNFs (e.g., VNFs associated with KPI source information 107) are implemented. The configuration information may include, for example, types and/or quantities of VNFs installed at particular data centers. For example, first data center configuration information 109 for a first data center may indicate that an Access and Mobility Management Function ("AMF"), User Plane Function ("UPF"), Session Management Function ("SMF"), and Unified Data Management function ("UDM") associated with a first network slice are implemented at the first data center. Further, second data center configuration information 109 for a different second data center may indicate that an AMF, UPF, SMF, and UDM associated with a different second network slice are implemented at the second data center. Further, third data center configuration information 109 for a different third data center may indicate that one or more elements associated with an Internet Protocol ("IP") Multimedia Subsystem ("IMS") core, such as a Proxy CSCF ("P-CSCF"), Serving CSCF ("S-CSCF"), I-CSCF, Home Subscriber Server ("HSS"), and TAS are implemented at the third data center. In some embodiments, data center configuration information 109 may include other information associated with respective data centers, such as geographical location, available and/or utilized hardware resources (e.g., processing resources, network resources, memory resources, storage resources, power resources, and/or other types of resources), and/or other attributes, characteristics, configuration information, or the like associated with data centers in which particular VNFs are implemented.

Inter-function interfaces/SLA information 111 may indicate interfaces, protocols, or the like between particular VNFs that are implemented at a given data center. For example, inter-function interfaces/SLA information 111 may indicate one or more pre-defined interfaces, including Third Generation Partnership ("3GPP") interfaces. Such interfaces may include, for example, a N11 interface between an AMF and a UPF, a N4 interface between a UPF and a SMF, a S11 interface between a Mobility Management Entity ("MME") and a Serving Gateway ("SGW"), a S5 interface between a SGW and a Packet Data Network ("PDN") Gateway ("PGW"), and/or other types of interfaces between other types of VNFs. In some embodiments, particular VNFs or interfaces may be associated with inter-VNF SLAs, such as latency, packet error and/or loss rate, throughput, etc. For example, a given inter-VNF SLA may include a threshold latency of communications from a HSS to an I-CSCF. As discussed below, such inter-VNF SLAs may be met, or may have a higher likelihood of being met, when the VNFs are implemented at the same data center, while implementing the VNFs at different data centers may cause such SLAs to not be met (e.g., latency of communications between the data centers may result in an increased latency between the VNFs when implemented at different data centers).

Different classification models 103 may be associated with different combinations, relationships, etc. between different sets of KPI information 105, KPI source information 107, data center configuration information 109, and/or inter-function interfaces/SLA information 111. For example, two different classification models 103 may include the same KPI information 105, KPI source information 107, and data center configuration information 109, but may include different inter-function interfaces/SLA information 111. As another example, two different classification models 103 may include the same KPI information 105 and KPI source information 107, but may include different data center configuration information 109.

Classification models 103 may be received, generated, modified, etc. during a "training" phase associated with one or more artificial intelligence/machine learning ("AI/ML") techniques. For example, RAS 101 may perform one or more simulations of various VNFs implemented at various data centers, in order to determine values for KPI information 105, KPI source information 107, data center configuration information 109, and/or inter-function interfaces/SLA information 111. Additionally, or alternatively, RAS 101 may receive real-world measured data associated with one or more data centers, and may generate or refine classification models 103 based on such measured data. Various combinations or ranges of KPI information 105, KPI source information 107, data center configuration information 109, and inter-function interfaces/SLA information 111 may be associated with particular classification models 103 using K-means clustering, mean-shift clustering, Gaussian mixture models, regression analysis, and/or other suitable clustering and/or classification techniques. As discussed below, the classification, clustering, etc. may be performed based on various sets of parameters (e.g., KPI information 105, KPI source information 107, data center configuration information 109, and/or inter-function interfaces/SLA information 111) for which the same or similar types of remediation models 113 apply. Briefly, for example, a data center with a first set of VNFs, that exhibit a first set of KPIs, may be associated with the same remediation model 113 as a data center with a second set of VNFs that exhibit a second set of KPIs. As another example, in some scenarios, a data center with a particular set of VNFs that exhibit a first set of KPIs may be associated with a different remediation model than the same data center with the same particular set of VNFs when such VNFs exhibit a different second set of KPIs.

Remediation models 113 may include a set of actions to perform in order to remediate situations in which one or more VNFs exhibit KPI values that indicate that such VNFs (and/or other VNFs) are experiencing or approaching a service degradation. Such actions may include, and/or may be based on, failover dependencies/constraint information 115, which may indicate, for example, which VNFs should be failed over when KPIs associated with one or more VNFs are detected as being associated with a failover condition, such as a service degradation or approaching a service degradation.

For example, failover dependencies/constraint information 115 may be based on interface-based dependencies, such as an indication that if one particular VNF is failed over from one data center to another, other VNFs that communicate with the particular VNF over one or more particular interfaces should be failed over to the other data center as well. As one example, failover dependencies/constraint information 115 may indicate that if a MME is failed over and if a SGW (e.g., which may communicate with the MME via a S11 interface) is implemented by the same data center as the MME, then the SGW should be failed over as well. As noted above, data center configuration information 109 and/or inter-function interfaces/SLA information 111, associated with classification models 103, may indicate whether the MME and SGW are implemented by the same data center. That is, for example, if the MME is exhibiting one or more KPIs that do not meet a threshold level (and/or that are approaching such threshold level), failover dependencies/constraint information 115 may indicate that the SGW should be failed over to another data center if the MME is failed over. Further examples of remediation models 113, which may apply to particular classification models 103, are described below.

As noted above, RAS 101 may correlate (at 117) one or more classification models 103 to one or more remediation models 113. In some embodiments, RAS 101 may use AI/ML techniques in order to correlate a given classification model 103 with a given remediation model 113. For example, RAS 101 may evaluate KPIs associated with failed over VNFs and/or VNFs that are not failed over (e.g., which are left to be implemented by a data center from which other VNFs are failed over), in order to determine whether a given remediation model 113 is appropriate (e.g., yields optimal results, higher KPIs, etc.) for a given classification model 103. RAS 101 may further refine such correlations on an ongoing basis, in order to yield optimal results for given situations (e.g., differing classification models 103). The correlation (at 117) of a given classification model 103 to a particular remediation model 113 may indicate, for example, that if one or more KPIs associated with one or more VNFs specified by classification model 103 satisfy one or more failover conditions specified by classification model 103, then one or more remediation actions specified by remediation model 113 may be performed. For example, one example remediation action specified by remediation model 113 may indicate that the one or more VNFs with which the one or more KPIs are associated should be failed over to another data center, and/or that one or more other VNFs should be failed over to another data center.

Figure 2:
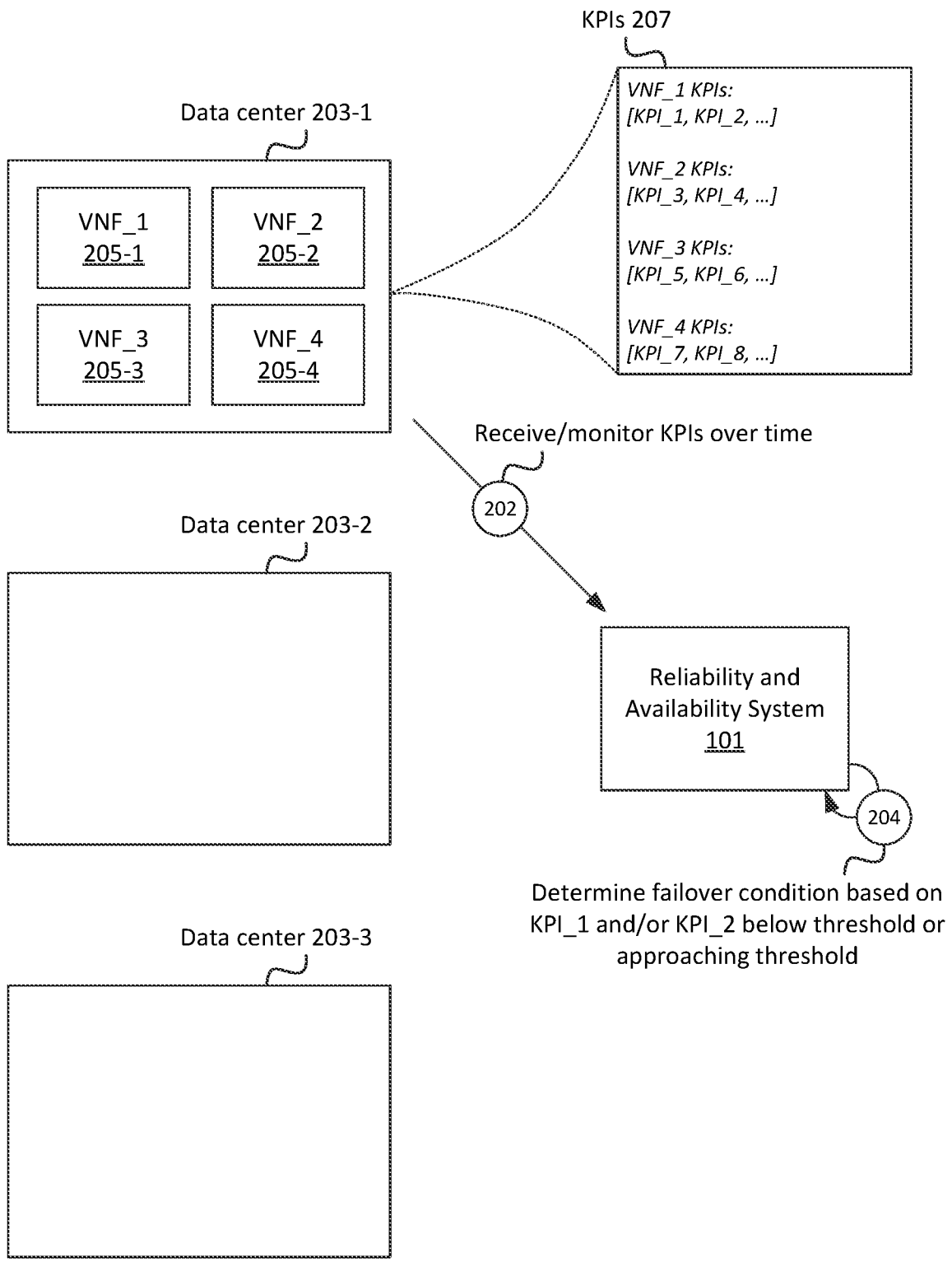
FIG. 2 illustrates an example of the RAS monitoring KPIs associated with a set of VNFs implemented at a particular data center, in accordance with some embodiments.

As shown in FIG. 2, for example, a first data center 203-1 may implement a set of VNFs 205. Specifically, for example, data center 203-1 may implement VNF 205-1 (also referred to as "VNF_1"), VNF 205-2 (also referred to as "VNF_2"), and so on. For example, data center 203-1 may include a set of hardware resources that may be provisioned or otherwise configured to implement VNFs 205-1 through 205-4. Data center 203 may, for example, include a containerized system that implements one or more containers, virtual machines, or the like, that implement VNFs 205-1 through 205-4. Containerized systems may be managed by management facilities that support node lifecycle operations such as orchestration, deployment, and scaling. For example, such operations may be implemented using the open-source Kubernetes system. In such examples, RAS 101 may implement such orchestration, deployment, and/or scaling functions, which may include the capability to instruct one or more data centers 203-1, 203-2, 203-3, or other data centers or other configurable resources to implement, instantiate, activate, etc. VNFs 205.

For example, data centers 203-2 and 203-3 are illustrated in FIG. 2 as blank boxes, to signify that VNFs 205-1 through 205-4 are implemented by data center 203-1 in this scenario. In practice, data centers 203-2 and/or 203-3 may implement one or more other VNFs, and/or other instances of VNFs 205-1, 205-2, 205-3, and/or 205-4. Further, in some embodiments, data centers 203-2 and/or 203-3 may implement duplicate instances of one or more of VNFs 205-1 through 205-4. In such embodiments, a failover of a given VNF 205 from data center 203-1 to data center 203-2 or data center 203-3 may include activating a corresponding instance of the same VNF 205 at data center 203-2 and/or data center 203-3.

As similarly noted above, VNFs 205-1 through 205-4 may include one or more VNFs associated with a wireless network, such as an AMF, a SMF, a MME, a SGW, a UPF, a HSS, a UDM, and/or one or more other VNFs. In some embodiments, VNFs 205-1 through 205-4 may include one or more VNFs associated with an IMS core network, such as one or more CSCFs (e.g., one or more I-CSCFs, P-CSCFs, and/or S-CSCFs), one or more TASs, and/or one or more other functions. Each VNF may be associated with a particular set of KPIs, which may be reported (at 202) directly by respective VNFs 205 via an API or other suitable communication pathway. Additionally, or alternatively, one or more other devices or systems may provide (at 202) KPIs associated with VNFs 205 to RAS 101. For example, a "master" node at data center 203-1, a hypervisor, or other component of data center 203-1 may measure, receive, or otherwise determine such KPIs, and may communicate the KPIs to RAS 101. In this manner, RAS 101 may monitor KPIs 207 associated with VNFs 205 on an ongoing basis, in real time or near-real time.

For example, as shown, KPIs 207 may include a first set of KPIs (including, for example, KPI_1 and KPI_2) associated with VNF_1, a second set of KPIs (including, for example, KPI_3 and KPI_4) associated with VNF_2, and so on. For example, as noted above, KPIs 207 may include KPIs such as quantity or percentage of successful calls, quantity or percentage of call failures, performance metrics such as latency, jitter, or throughput, and/or other types of KPIs associated with respective VNFs 205.

As one example, VNF_1 may include a P-CSCF, a S-CSCF, and/or an I-CSCF of an IMS network, and KPIs 207 associated with VNF_1 may be associated with UE registration failures, call failures, or the like. Such KPIs may include, for example, quantities of error codes received over a given time window, such as Diameter error code 5012—"Unable to Comply" or other Diameter error codes, SIP error codes, and/or other error indications.

As another example, KPIs 207 may include indicators of successful calls, such as a quantity or proportion over a given time window of calls that were completed successfully (e.g., without an error code), calls that were placed successfully (e.g., calls for which a called party acknowledged receipt of a call request), and/or other indicators of successful calls. In some embodiments, VNF_1 may include a session border controller ("SBC"), and KPIs 207 may include a quantity or proportion of requested calls that were successfully placed via the SBC, and/or a quantity or proportion of calls that were rejected by the SBC. In some embodiments, VNF_1 may include a P-CSCF, and KPIs 207 may include a quantity or proportion of errors at an Rx interface. For example, such errors may be based on rejections of calls based on policies provided to P-CSCF by a Policy Charging and Rules Function ("PCRF"), Policy Control Function ("PCF"), and/or other suitable source. As yet another example, VNF_1 may include one or more other types of functions involved in call setup, authentication, authorization, and/or other procedure, such as an HSS, an Authentication, Authorization, Accounting ("AAA") function, and/or other suitable devices, systems, functions, VNFs, or the like. Associated KPIs 207 may include quantities or proportions of indications of successful calls, rejected calls (e.g., calls rejected based on policies, authentication procedures, or for other reasons), call failures, or the like.

In some embodiments, VNF_1 may include a set of transcoding functions, and KPIs 207 may indicate a quantity or proportion of requested calls or other communications that were transcoded by the set of transcoding functions over a particular time window. In some embodiments, KPIs 207 may indicate a quantity of available simultaneous transcoding functions or threads, and/or an indication of capacity to simultaneously transcode a particular quantity of calls. In some embodiments, KPIs 207 may indicate a set of codecs used by the transcoders (e.g., to decode, encode, and/or re-encode calls or other communications).

In this example, RAS 101 may also determine (at 204) failover condition based on KPIs associated with VNF_1, such as KPI_1 and/or KPI_2. For example, RAS 101 may compare KPIs 207 to one or more classification models 103, and may determine that a particular classification model 103 includes KPI information 105 that matches KPI_1 and/or KPI_2, and that classification model 103 includes KPI source information 107 that includes VNF_1 (e.g., a function type or other identifying attribute of VNF_1). RAS 101 may also determine that a configuration of data center 203-1 matches data center configuration information 109 of particular classification model 103. For example, data center configuration information 109 may include indications of function types of VNF_1, VNF_2, VNF_3, and/or VNF_4 implemented at the same data center. Data center configuration information 109 may also include one or more other attributes for which data center 203-1 matches, such as a geographical location or area, a capacity of used or available resources, types or attributes of hardware resources (e.g., processor types, processor clock speeds, memory cache sizes, storage capacity, or the like), a physical facility size, and/or other attributes of data center 203-1.

Based on comparing KPIs 207 to classification models 103, KPIs 207 may determine that KPIs 207 (and/or a configuration of data center 203-1) corresponds to a particular classification model 103. In some embodiments, RAS 101 may determine that KPIs 207 correspond to multiple classification models 103. In such scenarios, RAS 101 may perform a suitable similarity analysis to determine which classification model 103 matches more closely. In some embodiments, RAS 101 may determine that KPIs 207 may match multiple classification models 103. For the sake of clarity, the discussion below assumes that KPIs 207 match a single classification model 103. Further, based on comparing KPIs 207 to classification model 103, RAS 101 may determine that KPIs 207 indicate that a failover condition has occurred.

For example, in this example, RAS 101 may determine that KPI_1 and/or KPI_2 are below a threshold or are approaching a threshold. As another example, RAS 101 may determine that KPI_1 and/or KPI_2 are approaching values associated with classification model 103 (e.g., KPI information 105). KPI information 105 may, for example, include KPI values related to the detection of an event (e.g., that a performance degradation has occurred), and/or the detection that an event is likely to occur (e.g., that a performance degradation is likely to occur, even if such degradation has not yet occurred).

In other words, in this example, RAS 101 may determine that KPIs of one VNF (e.g., VNF_1) are associated with a performance degradation or a potential/likely performance degradation, but may not necessarily determine that KPIs of one or more other VNFs are associated with a performance degradation or potential/likely performance degradation. In the examples described below, in accordance with some embodiments, RAS 101 may determine, based on the determined failover condition as well as one or more associated remediation models 113, RAS 101 may effect a failover of VNF_1 (e.g., associated with the KPIs indicating a potential performance degradation) and/or one or more other VNFs, which may not necessarily be individually associated with KPIs indicating a potential performance degradation.

Figure 3:
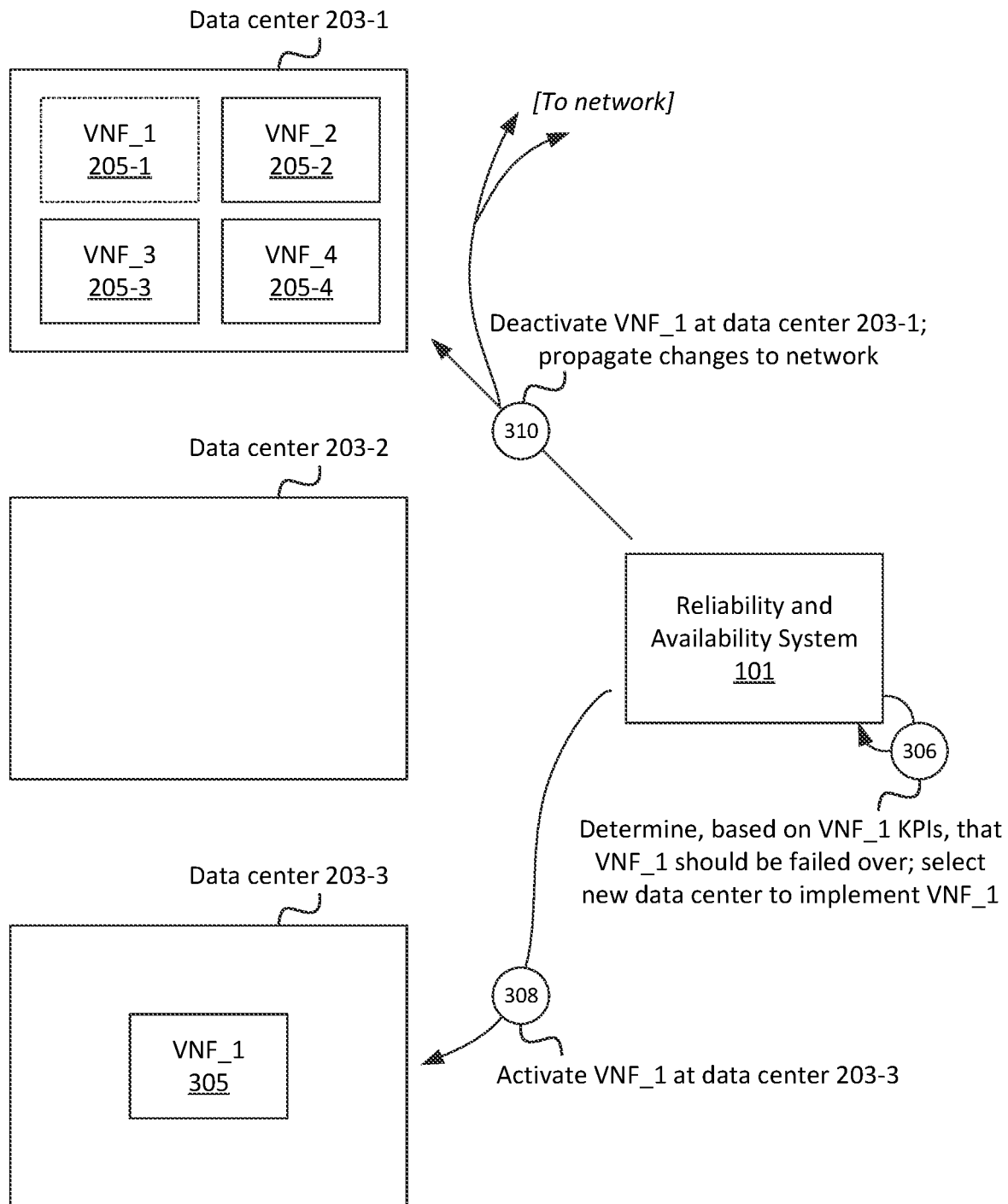
FIG. 3 illustrates an example of the RAS determining, based on one or more models, that a particular VNF should be failed over to a different data center based on KPIs associated with the particular VNF.

As shown in FIG. 3, for example, RAS 101 may determine (at 306) that VNF_1 should be failed over to a data center other than data center 203-1. For example, a given remediation model 113 that is associated with identified classification model 103 may indicate that the particular KPIs 207 associated with VNF_1 indicate a potential failure or incompatibility between attributes of data center 203-1 and VNF_1. In such a scenario, remediation model 113 may indicate that such failover event may be remediated by failing VNF_1 over to another data center, without needing to failover other VNFs. In some embodiments, RAS 101 may select a particular data center (e.g., may select data center 203-3 out of a set of candidate data centers that includes at least data center 203-2 and data center 203-3) based on one or more suitable factors. For example, RAS 101 may select data center 203-3 based on geographical proximity of data center 203-3 to data center 203-1 (e.g., data center 203-3 may be closer to data center 203-1 than data center 203-2 is to data center 203-1), a configuration of data center 203-3, available and/or type of resources associated with data center 203-3, and/or other factors based on which data center 203-3 is differentiated from data center 203-2.

Accordingly, RAS 101 may activate (at 308) an instance 305 of VNF_1 at data center 203-3. For example, RAS 101 may instruct a controller, hypervisor, or the like associated with data center 203-3 to instantiate VNF_1, to activate a previously instantiated VNF_1, or the like. In some embodiments, data center 203-3 and/or instance 305 of VNF_1 may be configured with routing tables, hostnames, or the like to allow VNF_1 to send and/or receive traffic from other devices or systems, such as VNF2, VNF_3, VNF_4, and/or other devices or systems.

RAS 101 may further deactivate (at 310) VNF_1 at data center 203-1, and propagate the failover to one or more network elements. For example, RAS 101 may instruct a controller, hypervisor, etc. of data center 203-1 to de-provision, deactivate, etc. the previously active instance 205-1 of VNF_1. RAS 101 may, for example, cause one or more routing tables, hostnames, or the like associated with data center 203-1 to be updated to reflect the failed over instance 305 of VNF_1. In some embodiments, data center 203-1, RAS 101, and/or one or more other devices or systems may propagate this change using dynamic routing techniques, Border Gateway Protocol ("BGP") techniques, and/or other suitable route propagation techniques. In this manner, the failover may be effective from the perspective of devices or systems with which VNF_1 communicates.

Figure 4:
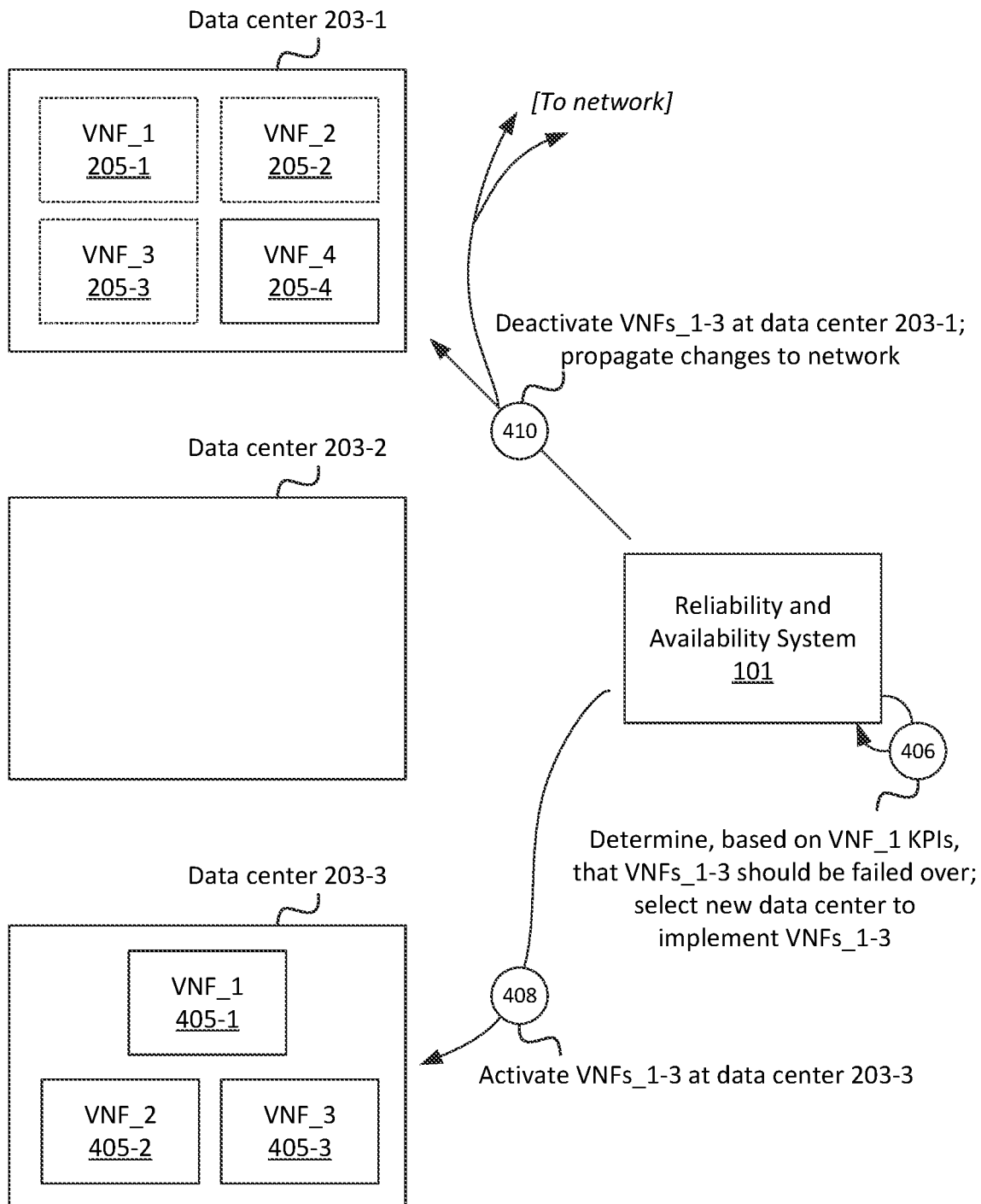
FIGS. 4 and 5 illustrate examples of the RAS determining, based on one or more models, that a particular set of VNFs should be failed over to one or more different data centers based on KPIs associated with a particular VNF.

In the example of FIG. 4, the identified classification model 103, based on which RAS 101 determined (at 204) the failover condition, that one or more additional VNFs 205 at data center 203-1 should be failed over, based on detecting the failover condition associated with KPIs 207 of VNF_1. As one example, VNF_1 may include a P-CSCF for which at least a threshold proportion of calls over a given time window (e.g., 1% of all calls over the time window) have failed. For example, the P-CSCF may report one or more error codes, such as a Diameter 5012 error code, for at least the threshold proportion of calls handled by the P-CSCF over the given time window. In this example, failover dependencies/constraint information 115 may indicate that if the P-CSCF is failed over, an associated I-CSCF and S-CSCF should be failed over as well. In this example, assume that VNF_2 implements an I-CSCF associated with the P-CSCF implemented by VNF_1, and that VNF_3 implements a S-CSCF associated with the P-CSCF implemented by VNF_1. Further, inter-function interfaces/SLA information 111 associated with VNF_1, VNF_2, and/or VNF_3 may indicate that these VNFs communicate via one or more interfaces, such as a Mw interface. Further assume that VNF_4 is a function with which inter-function interfaces/SLA information 111 does not indicate any interfaces or communications between VNF_4 and VNF_1, VNF_2, and/or VNF_3.

In this example, RAS 101 may determine (at 406) that VNF_1, VNF_2, and VNF_3 should be failed over, based on KPIs 207 associated with VNF_1. As described above, the determination to fail over VNF_2 and VNF_3 may made independently of any KPIs associated with VNF_2 and/or VNF_3, and/or without receiving or analyzing any such KPIs associated with VNF_2 and/or VNF_3. In this example, RAS 101 may select data center 203-3 to implement instances 405-1, 405-2, and 405-3 of VNF_1, VNF_2, and VNF_3, respectively. For example, as similarly discussed above, RAS 101 may select data center 203-3 out of a set of candidate data centers based on attributes, performance metrics, capacity, and/or other attributes of data center 203-3. RAS 101 may accordingly activate (at 408) instances 405-1, 405-2, and 405-3 of the identified VNF_1, VNF_2, and VNF_3 at data center 203-3, may deactivate (at 410) the identified VNFs at data center 203-1, and may propagate the change to allow other network elements to communicate with failed over instances 405 of VNF_1, VNF_2, and VNF_3.

In some embodiments, failover dependencies/constraint information 115, associated with remediation model 113, may indicate that VNF_1, VNF_2, and VNF_3 should be implemented by the same data center 203. Additionally, or alternatively, inter-function interfaces/SLA information 111 may indicate that SLAs associated with VNF_1, VNF_2, and VNF_3 indicate that these VNFs 205 should be implemented by the same data center 203. For example, inter-function interfaces/SLA information 111 may indicate a maximum threshold latency of communications between VNF_1, VNF_2, and VNF_3. RAS 101 may determine or receive performance metrics information that indicates that a latency of communications between different data centers 203 exceeds the maximum threshold latency, based on which RAS 101 may determine that VNF_1, VNF_2, and VNF_3 should be implemented by the same data center. In other examples, although not shown in this figure, RAS 101 may determine that such maximum threshold latency may be satisfied (e.g., not exceeded) if VNF_1 is implemented at one data center 203 and VNF_2 and VNF_3 are implemented at another data center 203. In such an occurrence, RAS 101 may select these two different data centers 203 to implement VNF_1, VNF_2, and VNF_3 in the manner outlined above.

Figure 5:
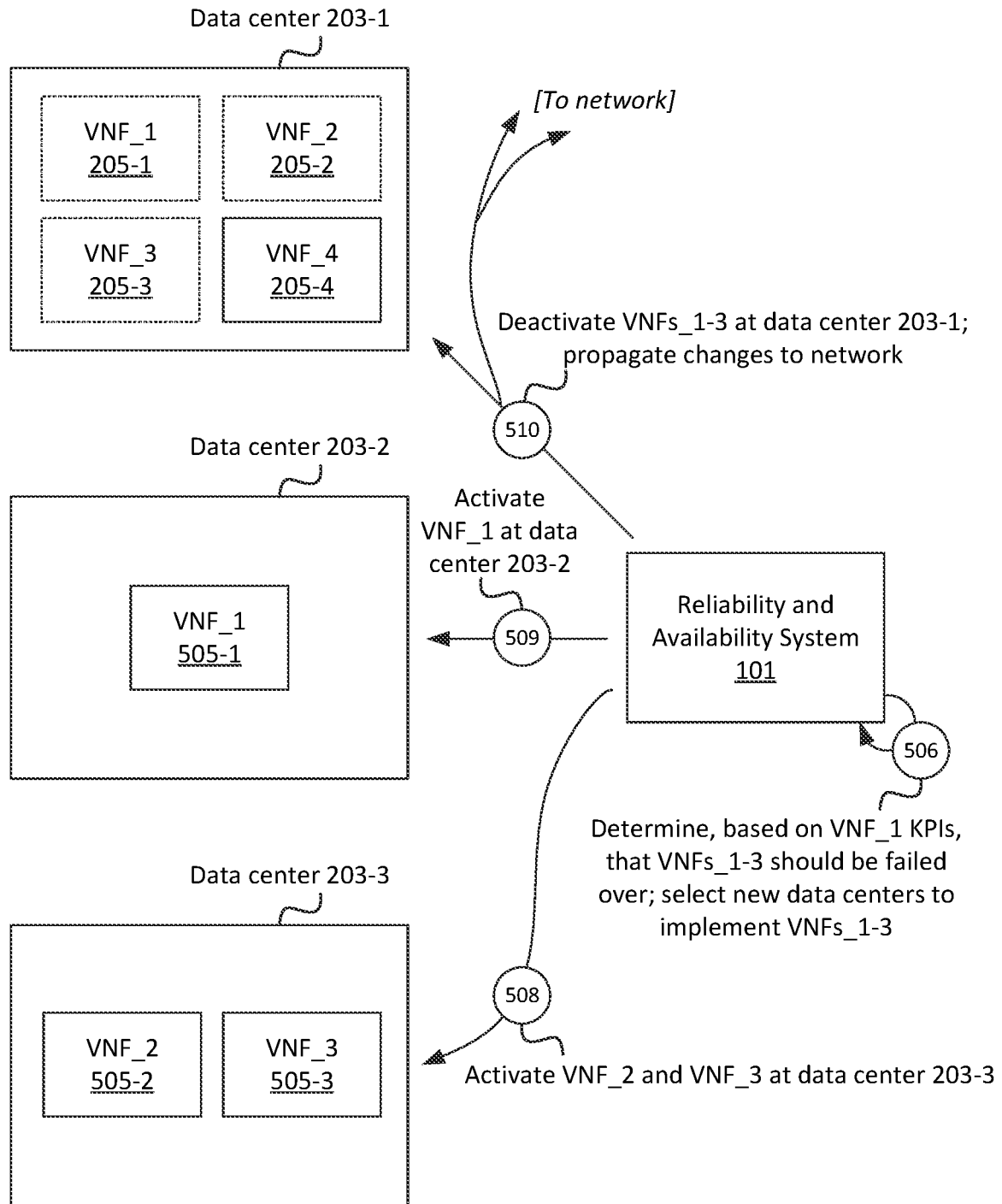

For example, as shown in FIG. 5, RAS 101 may select data center 203-2 to implement instance 505-1 of VNF_1 and may select data center 203-3 to implement instances 505-2 and 505-3 of VNF_2 and VNF3, respectively. For example, RAS 101 may determine that data center 203-2 and data center 203-3 communicate with relatively low latency, such that communications between VNF_2 and/or VNF_3, as implemented by data center 203-3, and VNF_1 as implemented by data center 203-2, may exhibit a lower latency than a maximum latency threshold, as indicated by inter-function interfaces/SLA information 111 associated with VNF_1, VNF_2, and VNF_3.

As another example, VNF_2 may be associated with a first UPF (e.g., associated with a first network slice, associated with a first network provider, etc.) and VNF_3 may be associated with a second UPF (e.g., associated with a different second network slice, associated with a different second network provider, etc.). VNF_2 and VNF_3 may, as indicated by inter-function interfaces/SLA information 111, communicate via a N9 interface. Further, in this example, VNF_1 may be a different VNF that does not communicate with VNF_2 or VNF_3, and/or which may not have an interface with VNF_2 or VNF_3 as indicated by inter-function interfaces/SLA information 111. For example, remediation model 113 may include failover dependencies/constraint information 115, which may indicate that VNFs that communicate via a N9 interface should be failed over together.

In this example, assume that classification model 103, associated with the KPIs 207 received from VNF_1, indicates that overall performance of data center 203-1 is degrading, such that performance associated with VNF_1, VNF_2, VNF_3 is likely to become degraded. Further, assume in this example that such performance degradation may not impact VNF_4, and/or may not cause performance of VNF_4 to fall below threshold KPI values associated with VNF_4. For example, VNF_4 may be associated with relatively low performance requirements, while VNF_1, VNF_2, and VNF_3 may be associated with relatively high performance requirements.

Accordingly, based on such information, RAS 101 may instruct data center 203-3 to activate (at 508) instances 505-2 and 505-3 of VNF_2 and VNF_3, respectively. Further, as RAS 101 may have determined that VNF_1 should be failed over but may not have determined that there is any requirement to implement VNF_1 at the same data center 203 as VNF_2 and VNF_3, RAS 101 may select data center 203-2 to implement (at 509) VNF_1 based on some suitable criteria. Further, RAS 101 may deactivate (at 510) VNF_1, VNF_2, and VNF_3 at data center 203-1, and may further propagate the failover to one or more other network elements.

Figure 6:
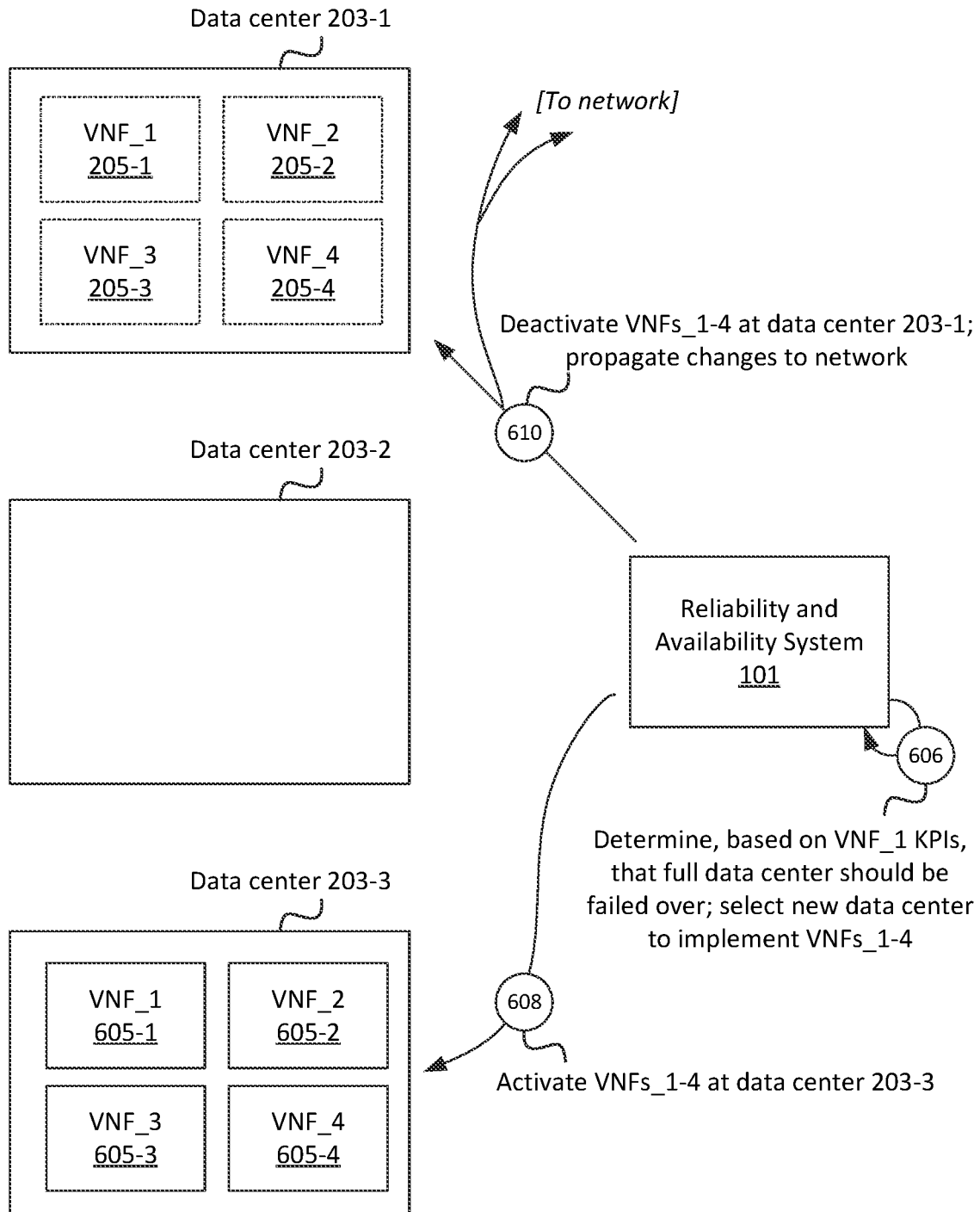
FIG. 6 illustrates an example of the RAS determining, based on one or more models, that all VNFs at a particular data center should be failed over to a different data center based on KPIs associated with a particular VNF.

In some embodiments, RAS 101 may detect a full site failover condition based on KPIs 207 associated with one or more VNFs at data center 203-1. For example, as shown in FIG. 6, RAS 101 may determine (at 606) that all VNFs implemented by data center 203-1 should be failed over. For example, KPIs 207 associated with VNF_1 and/or one or more other VNFs 205 may meet failover criteria associated with a given classification model 103. In some embodiments, such failover criteria may include detecting that failover conditions exist with respect to different VNFs 205 that do not have inter-VNF communication interfaces (e.g., as indicated by inter-function interfaces/SLA information 111).

For example, VNF_1 may include a TAS communicatively coupled to an IMS core network, and VNF_2 may include a UPF. RAS 101 may determine that KPIs 207 associated with VNF_1 indicate at least a threshold quantity of call failures over a particular time window. RAS 101 may further determine that KPIs 207 associated with VNF_2 indicate at least a threshold quantity of Packet Data Network ("PDN") attach failures. Inter-function interfaces/SLA information 111 may further not include any information indicating that VNF_1 and VNF_2 share a predefined interface. In this situation, RAS 101 may identify a particular classification model 103 based on KPIs 207 associated with VNF_1 and VNF_2, where such classification model 103 is associated with a failover of an entire data center. For example, such classification model 103 may indicate that data center 203-1 is failing, as the degradation of performance for unrelated VNFs may indicate a hardware failure or other type of failure to data center 203-1, even if degraded performance has not been detected (or has not yet been detected) at VNF_3 or VNF_4.

Accordingly, RAS 101 may activate (at 608) respective instances 605-1, 605-2, 605-3, and 605-4 of VNF_1, VNF_2, VNF_3, and VNF_4 at data center 203-3. In some embodiments, as similarly discussed above, RAS 101 may activate one or more of these VNFs 205 at one or more other data centers 203, in situations where RAS 101 determines (e.g., based on inter-function interfaces/SLA information 111 and/or failover dependencies/constraint information 115) that such VNFs 205 do not need to be implemented together. RAS 101 may further propagate the failover to one or more other network elements, as similarly discussed above.

Figure 7:
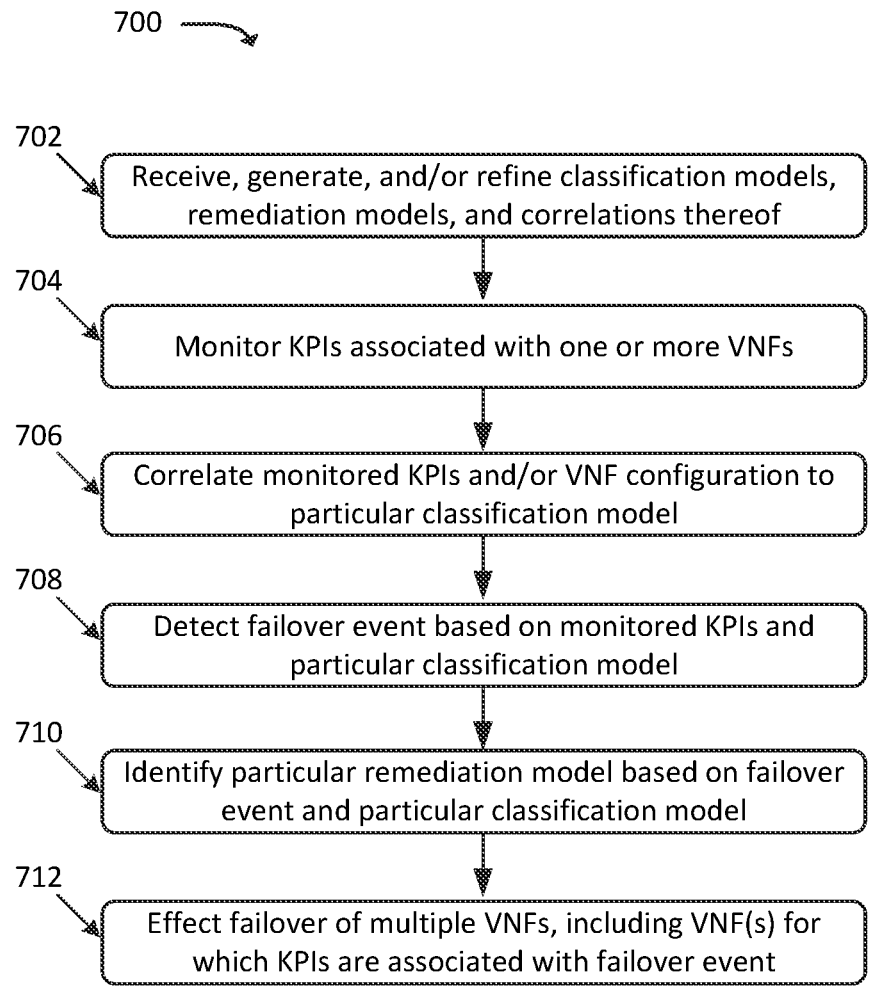
FIG. 7 illustrates an example process for effecting a failover of a group of VNFs based on KPIs associated with one or more VNFs of the group, in accordance with some embodiments.

FIG. 7 illustrates an example process 700 for effecting a failover of a group of VNFs 205 based on KPIs associated with one or more VNFs 205 of the group. In some embodiments, some or all of process 700 may be performed by RAS 101. In some embodiments, one or more other devices may perform some or all of process 700 in concert with, and/or in lieu of, RAS 101.

As shown, process 700 may include receiving, generating, and/or refining (at 702) one or more classification models 103, remediation models 113, and/or correlations 117 thereof. For example, as discussed above, classification models 103 may include KPI information 105, KPI source information 107, data center configuration information 109, inter-function interfaces/SLA information 111, and/or other suitable information based on which a set of VNFs 205 and/or data centers 203 may be classified, categorized, clustered, etc. For example, a first classification model 103 may be associated with a first set of VNFs 205 implemented by a first data center 203, a second classification model 103 may be associated with a second VNFs 205 implemented by a second data center 203, and so on. As another example, a first classification model 103 may be associated with a particular set of VNFs 205 with a first set of KPI information 105 (e.g., relatively low latency, relatively high call success rate, etc.), while a second classification model 103 may be associated with the same set of VNFs 205 with a second set of KPI information 105 (e.g., relatively high latency, relatively low call success rate, etc.).

In some embodiments, classification model 103 may be associated (at 117) with one or more remediation models 113. For example, a given remediation model 113 may indicate that one or more VNFs 205 should be failed over from a first data center 203 to one or more other data centers 203, and/or may include failover dependencies/constraint information 115, based on which the failing over of one VNF 205 to another data center 203 may indicate that one or more other VNFs 205 should be failed over. As discussed above, failover dependencies/constraint information 115 may also specify particular VNFs 205 that are required to be implemented by the same data center 203, and/or may indicate VNFs 205 that are not required to be implemented by the same data center 203.

As noted above, RAS 101 may use AI/ML techniques or other suitable techniques in order to refine associations 117 between classification models 103 and remediation models 113, and/or to refine classification models 103 and/or remediation models 113. Such refinement may enhance the accuracy of correlating KPIs of one or more VNFs 205 and/or data centers 203 to particular classification models 103 and/or remediation models 113.

Process 700 may further include monitoring (at 704) KPIs associated with one or more VNFs 205. For example, as discussed above, RAS 101 may receive KPIs 207 from VNFs 205, from data center 203 at which VNFs 205 are implemented, and/or some other source that determines or generates KPIs 207 associated with VNFs 205. As also discussed above, such KPI information may include performance metrics (e.g., latency, throughput, jitter, packet error rate, or the like), call failure and/or success rates, error codes (e.g., SIP error codes, Diameter error codes, etc.), and/or other suitable KPIs 207. RAS 101 may monitor KPIs 207 on an ongoing basis, in order to continuously evaluate VNFs 205 and/or data centers 203.

Process 700 may additionally include correlating (at 706) the monitored KPIs 207 to a particular classification model 103. For example, RAS 101 may perform a suitable similarity analysis to match a set of monitored KPIs 207 of one or more VNFs 205 to a particular classification model 103 (e.g., based on KPI information 105 and/or KPI source information 107 associated with classification model 103). In some embodiments, RAS 101 may identify an exact match between monitored KPI values 207 and KPI information 105 associated with classification model 103. In some embodiments, RAS 101 may determine that monitored KPI values 207 "match" KPI information 105 associated with classification model 103 with at least a threshold measure of similarity, based on a suitable similarity analysis as mentioned above. That is, in such situations, RAS 101 may not determine an exact match, but that KPI values 207 are within a threshold measure of similarity of KPI information 105.

In some embodiments, as discussed above, RAS 101 may identify a particular classification model 103 based on one or more configurations and/or attributes of data center 203, in which VNFs 205 are implemented. For example, a particular classification model 103 may include data center configuration information 109, which may include attributes of data center 203, such as available and/or used resources, physical facility size, types of hardware provided in data center 203, and/or other parameters. In some embodiments, data center configuration information 109 may further specify types and/or amounts of VNFs 205 implemented at data center 203. For example, a data center 203 that implements a P-CSCF, an I-CSCF, a S-CSCF, and a TAS may be considered as having a different data center configuration information 109 than a data center 203 that does not implement a P-CSCF, an I-CSCF, a S-CSCF, and a TAS.

Process 700 may also include detecting (at 708) a failover event based on the monitored KPIs 207 and/or the particular identified classification model 103. For example, classification model 103 may specify one or more threshold KPI values that indicate that a particular failover event has occurred, or is likely to occur. In some embodiments, the determination of particular classification model 103 may itself be a detection that a failover event has occurred. For example, one or more classification models 103 may themselves be an indication that a failover event has occurred. As noted above, the rate at which particular threshold values are approached by KPIs 207 may be a factor based on which a failover event is detected.

Process 700 may further include identifying (at 710) a particular remediation model based on the failover event and the particular classification model 103. For example, RAS 101 may identify a particular remediation model 113 based on an association 117 between remediation model 113 and classification model 103. In some embodiments, as noted above, remediation model 113 may indicate that particular sets of VNFs 205 are required to be implemented at the same data center 203. In some embodiments, such constraints may be based on inter-function interfaces/SLA information 111.

Process 700 may additionally include effecting (at 712) a failover of multiple VNFs 205, including one or more VNFs 205 for which KPIs 207 are associated with the detected failover event. For example, as discussed above, based on remediation model 113 (e.g., failover dependencies/constraint information 115 specified by remediation model 113) and/or inter-function interfaces/SLA information 111, RAS 101 may identify multiple VNFs 205 to be failed over, based on KPIs 207 associated with one or more other VNFs 205. As discussed below, for example, the failover of multiple VNFs 205 may be distributed to multiple data centers 203, such that SLAs or other performance constraints pertaining to communications between such VNFs 205 are preserved.

Figure 8:
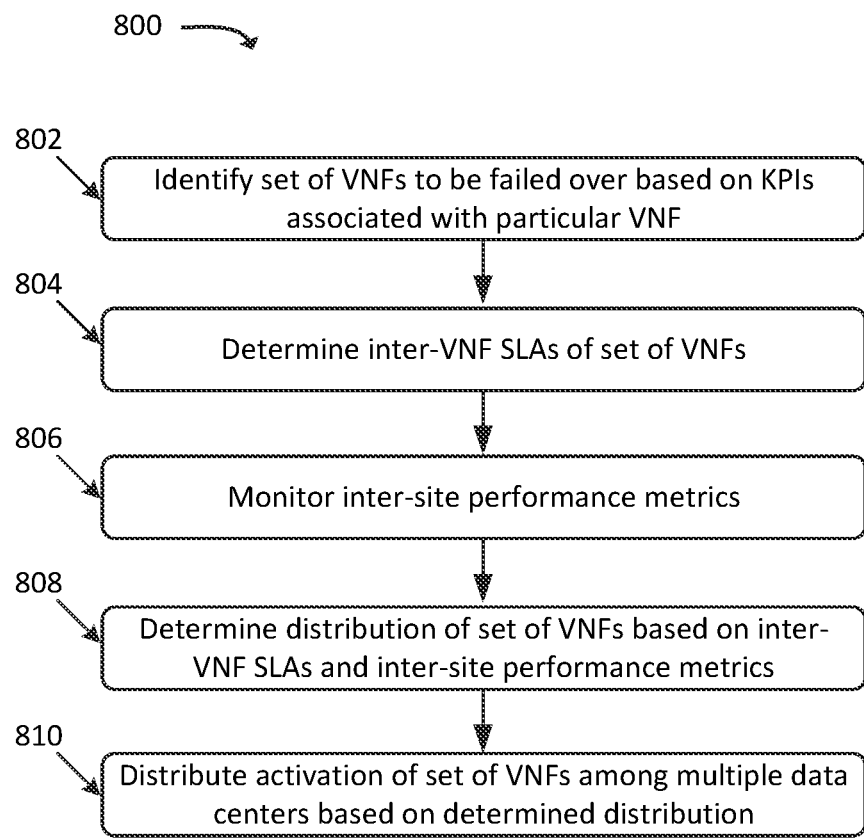
FIG. 8 illustrates an example process for effecting a failover of multiple VNFs to multiple data centers, in accordance with some embodiments.

For example, FIG. 8 illustrates an example process 800 for effecting a failover of multiple VNFs 205 to multiple data centers 203. In some embodiments, some or all of process 800 may be performed by RAS 101. In some embodiments, one or more other devices may perform some or all of process 800 in concert with, and/or in lieu of, RAS 101.

As shown, process 800 may include identifying (at 802) a set of VNFs 205 to be failed over based on KPIs 207 associated with a particular VNF 205. For example, as similarly described above (e.g., with respect to process 700 and/or some other suitable process), RAS 101 may identify a set of VNFs 205 to fail over from one data center 203 to one or more other data centers 203. For example, RAS 101 may determine that a particular VNF 205 is exhibiting KPIs 207 indicative of a performance degradation or imminent performance degradation associated with the particular VNF 205 as well as one or more other VNFs 205.

Process 800 may further include determining (at 804) inter-function interfaces/SLA information 111 associated with the set of VNFs 205. For example, such information may specify a maximum latency of communications between some or all of the VNFs 205 of the set of VNFs 205. As similarly noted above, RAS 101 may identify failover dependencies/constraint information 115, which may indicate whether particular VNFs 205 are required to be implemented by the same data center 203.

Process 800 may additionally include monitoring (at 806) inter-site performance metrics. For example, RAS 101 may monitor, determine, receive, etc. performance metrics associated with communications between multiple data centers 203. Such performance metrics may include, for example, latency of communications between data centers 203, available throughput of communications between data centers 203, and/or other suitable performance metrics. In some embodiments, the performance metrics monitored (at 806) may include, and/or may otherwise be based on, performance metrics specified by inter-function interfaces/SLA information 111.

Process 800 may also include determining (at 808) a distribution of the set of VNFs 205 to be failed over, based on inter-function interfaces/SLA information 111, failover dependencies/constraint information 115, and/or the determined inter-site performance metrics. For example, RAS 101 may determine whether any of the VNFs 205, of the determined set of VNFs 205, may be implemented by a different data center 203 than one or more other VNFs 205 of the set of VNFs 205. For example, RAS 101 may determine that inter-function interfaces/SLA information 111 specifies a maximum latency between a first VNF 205 and a second VNF 205 of the set of VNFs, and may further determine that a measured latency (e.g., average latency over time, median latency over time, maximum latency in a given time window, or some other computed metric of measured latency) between two data centers 203 is below the specified maximum latency. In such an example, RAS 101 may determine that the first and second VNFs 205 may be implemented by the first and second data centers 203, respectively. While the above presents a simplified example, in practice, similar concepts may be expanded to failover multiple (e.g., three or more) VNFs 205 by distributing such multiple VNFs 205 over multiple data centers 203 (e.g., two or more data centers 203, three or more data centers 203, etc.).

Process 800 may further include distributing (at 810) the activation of the set of VNFs 205 among the multiple data centers 203. For example, RAS 101 may cause a first data center 203 to activate, provision, instantiate, etc. a first VNF 205 of the set of VNFs 205, and may cause a second data center 203 to activate, provision, instantiate, etc. a second VNF 205 of the set of VNFs 205. As noted above, RAS 101 may further propagate the failover to one or more other network elements, such that the failed over VNFs 205 may continue seamless operations with minimal or no network interruption.

Figure 9:
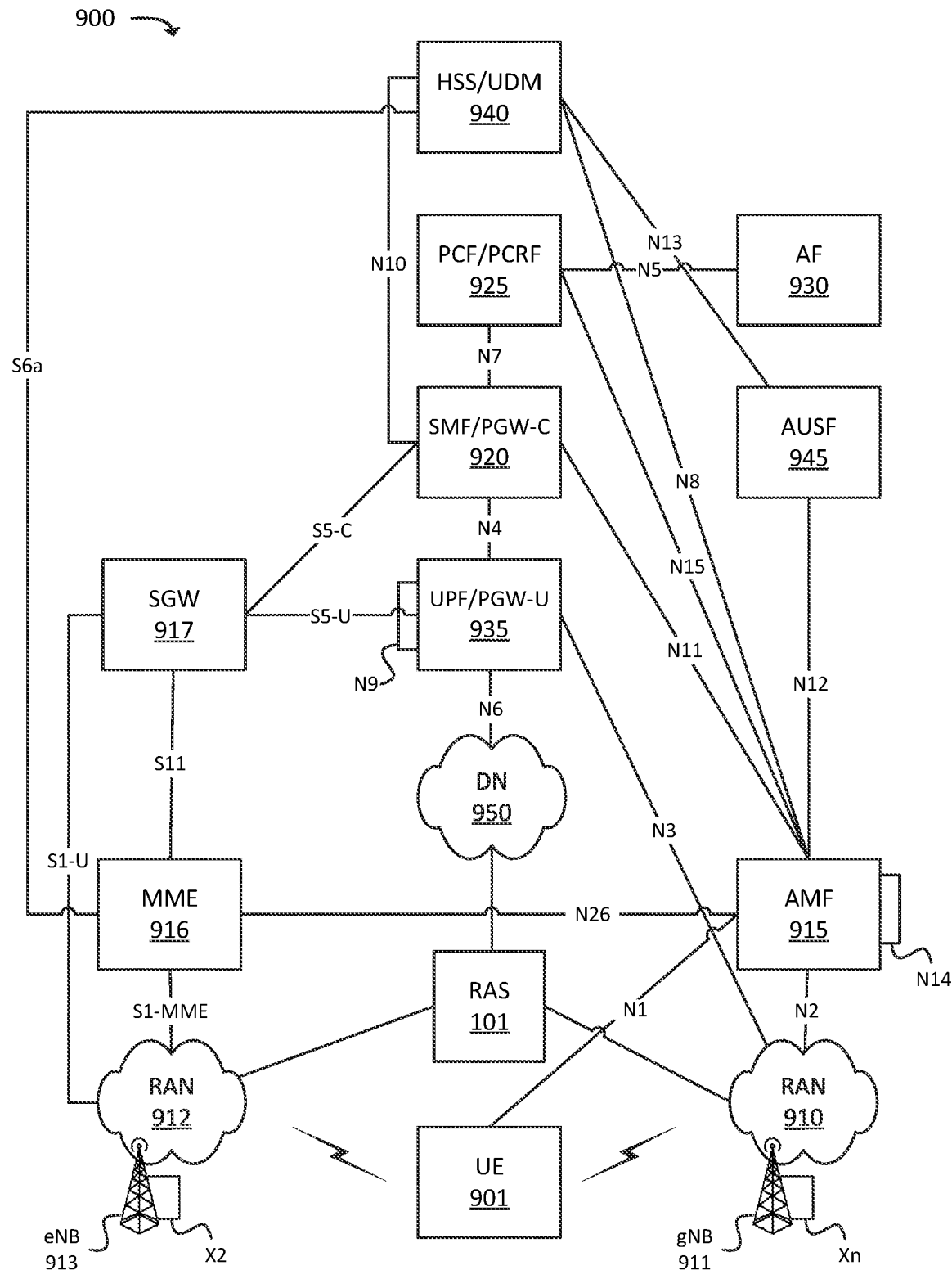
FIG. 9 illustrates an example environment in which one or more embodiments, described herein, may be implemented.

FIG. 9 illustrates an example environment 900, in which one or more embodiments may be implemented. In some embodiments, environment 900 may correspond to a 5G network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 901, RAN 910 (which may include one or more Next Generation Node Bs ("gNBs") 911), RAN 912 (which may include one or more one or more evolved Node Bs ("eNBs") 913), and various network functions such as AMF 915, MME 916, SGW 917, SMF/PGW-Control plane function ("PGW-C") 920, PCF/PCRF 925, Application Function ("AF") 930, UPF/PGW-User plane function ("PGW-U") 935, HSS/UDM 940, and Authentication Server Function ("AUSF") 945. Environment 900 may also include one or more networks, such as Data Network ("DN") 950. Environment 1100 may include one or more additional devices or systems communicatively coupled to one or more networks (e.g., DN 950), such as RAS 101

The example shown in FIG. 9 illustrates one instance of each network component or function (e.g., one instance of SMF/PGW-C 920, PCF/PCRF 925, UPF/PGW-U 935, HSS/UDM 940, and/or 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or 945, while another slice may include a second instance of SMF/PGW-C 920, PCF/PCRF 925, UPF/PGW-U 935, HSS/UDM 940, and/or 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900. In some embodiments, one or more of the devices or systems of environment 900 may be implemented by one or more data centers 203.

UE 901 may include a computation and communication device, such as a wireless mobile communication device that is capable of communicating with RAN 910, RAN 912, and/or DN 950. UE 901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 901 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 901 may communicate with one or more other elements of environment 900. UE 901 may communicate with RAN 910 via an air interface (e.g., as provided by gNB 911). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, AMF 915, and/or one or more other devices or networks) and may communicate the traffic to UE 901 via the air interface.

RAN 912 may be, or may include, a LTE RAN that includes one or more base stations (e.g., one or more eNBs 913), via which UE 901 may communicate with one or more other elements of environment 900. UE 901 may communicate with RAN 912 via an air interface (e.g., as provided by eNB 913). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, SGW 917, and/or one or more other devices or networks) and may communicate the traffic to UE 901 via the air interface.

AMF 915 may include one or more devices, systems, VNFs, etc., that perform operations to register UE 901 with the 5G network, to establish bearer channels associated with a session with UE 901, to hand off UE 901 from the 5G network to another network, to hand off UE 901 from the other network to the 5G network, manage mobility of UE 901 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 901 with the EPC, to establish bearer channels associated with a session with UE 901, to hand off UE 901 from the EPC to another network, to hand off UE 901 from another network to the EPC, manage mobility of UE 901 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate in the establishment of communications sessions on behalf of UE 901. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 901, from DN 950, and may forward the user plane data toward UE 901 (e.g., via RAN 910, SMF/PGW-C 920, and/or one or more other devices). In some embodiments, multiple UPFs 935 may be deployed (e.g., in different geographical locations), and the delivery of content to UE 901 may be coordinated via the N9 interface (e.g., as denoted in FIG. 9 by the line marked "N9" originating and terminating at UPF/PGW-U 935). Similarly, UPF/PGW-U 935 may receive traffic from UE 901 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 901.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 901 may communicate, through DN 950, with data servers, other UEs 901, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 901 may communicate.

RAS 101 may include one or more devices, systems, VNFs, etc. that perform one or more of the operations discussed herein. For example, RAS 101 may receive, generate, and/or refine classification models 103, remediation models 113, and/or correlations 117 thereof. RAS 101 may monitor KPIs associated with one or more network elements, VNFs, or other devices or systems. For example, RAS 101 may monitor KPIs associated with UE 901, RAN 910, RAN 912, AMF 915, MME 916, SGW 917, PGW-C 920, PCF/PCRF 925, AF 930, UPF/PGW-U 935, HSS/UDM 940, AUSF 945, and/or one or more other devices, systems, VNFs, etc. RAS 101 may identify particular constraints, interfaces, relationships, SLAs, etc. between various VNFs implemented at one or more data centers 203. RAS 101 may further identify failover events based on monitored KPIs, classification models 103, or the like. RAS 101 may identify particular remediation actions based on remediation models 113, which may include effecting a failover of one or more VNFs based on KPIs associated with one or more other VNFs (e.g., a failover of a group of VNFs based on KPIs associated with fewer VNFs than the entire group). In this manner, performance characteristics of the group of VNFs may be preserved with minimal or no service interruption, and without waiting for performance characteristics of the entire group of VNFs to degrade.

Figure 10:
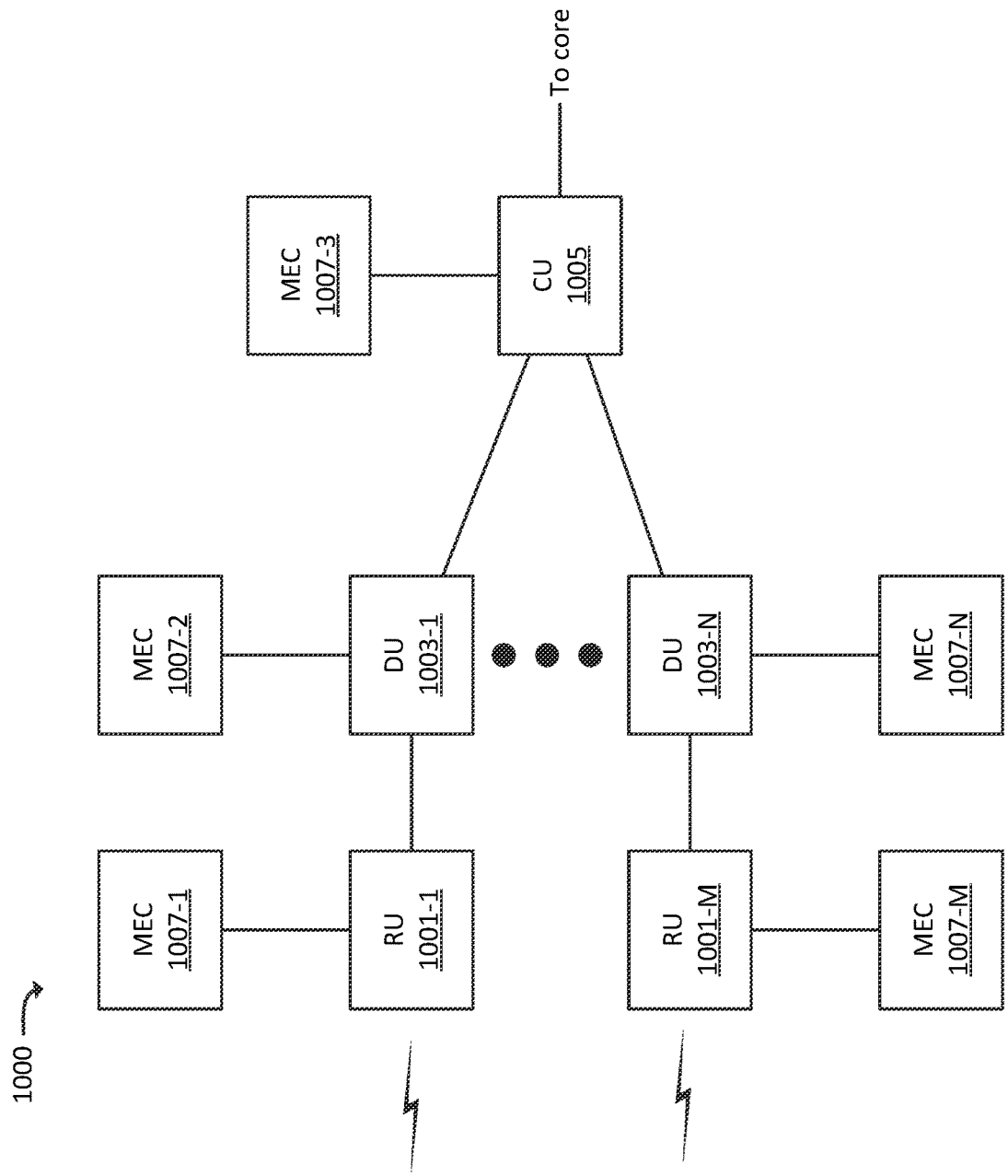
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 901 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 901, and may determine which DU(s) 1003 should receive the downlink traffic. DU 1003 may include one or more devices that transmit traffic between a core network (e.g., via CU 1005) and UE 901 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 901.

RU 1001 may include hardware circuitry (e.g., one or more RF transceivers, antennas, radios, and/or other suitable hardware) to communicate wirelessly (e.g., via an RF interface) with one or more UEs 901, one or more other DUs 1003 (e.g., via RUs 1001 associated with DUs 1003), and/or any other suitable type of device. In the uplink direction, RU 1001 may receive traffic from UE 901 and/or another DU 1003 via the RF interface and may provide the traffic to DU 1003. In the downlink direction, RU 1001 may receive traffic from DU 1003, and may provide the traffic to UE 901 and/or another DU 1003.

RUs 1001 may, in some embodiments, be communicatively coupled to one or more Multi-Access/Mobile Edge Computing ("MEC") devices, referred to sometimes herein simply as ("MECs") 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 901, via a respective RU 1001.

For example, RU 1001-1 may route some traffic, from UE 901, to MEC 1007-1 instead of to a core network (e.g., via DU 1003 and CU 1005). MEC 1007-1 may process the traffic, perform one or more computations based on the received traffic, and may provide traffic to UE 901 via RU 1001-1. In this manner, ultra-low latency services may be provided to UE 901, as traffic does not need to traverse DU 1003, CU 1005, and an intervening backhaul network between DU network 1000 and the core network. In some embodiments, MEC 1007 may include, and/or may implement some or all of the functionality described above with respect to RAS 101.

Figure 11:
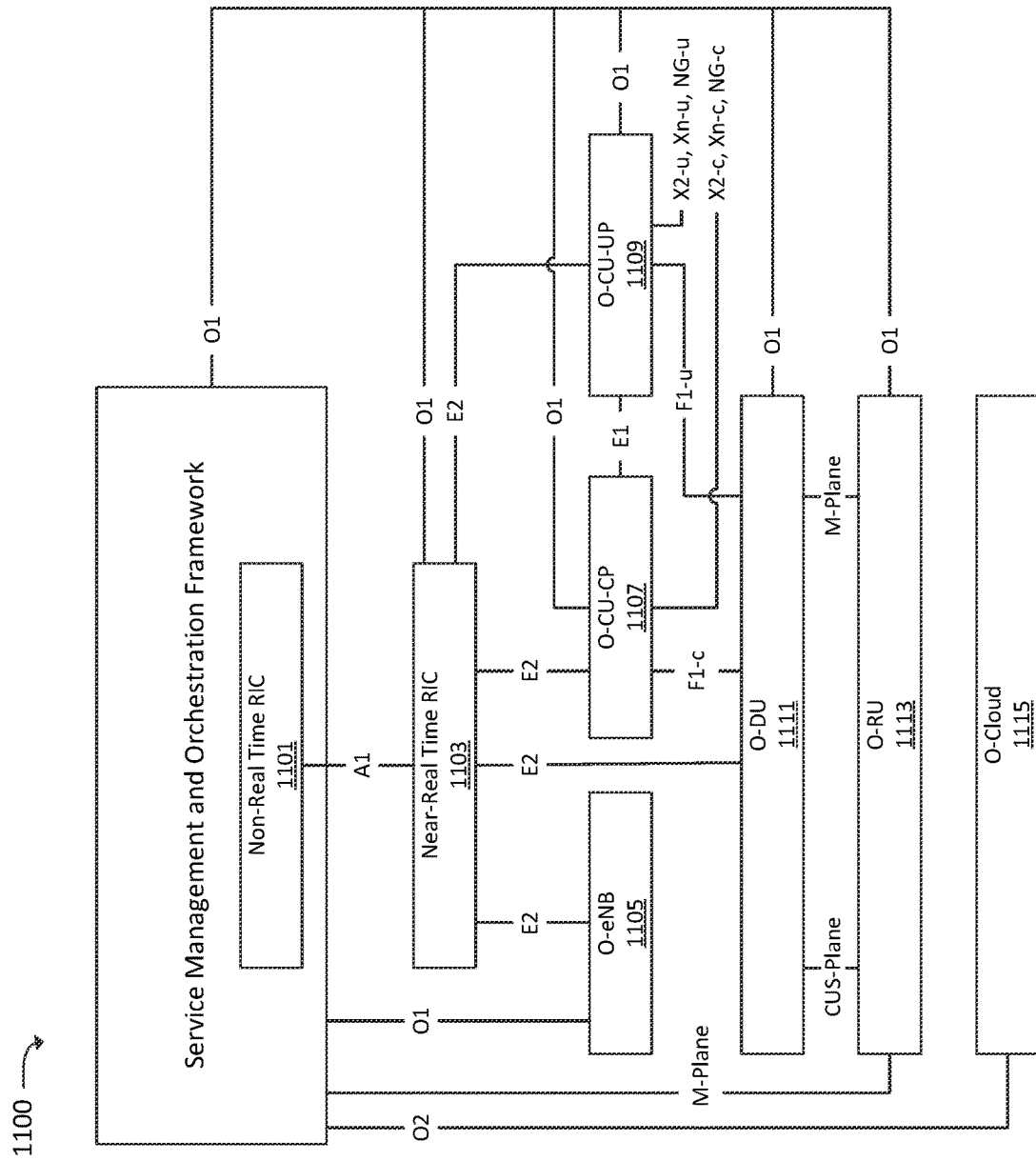
FIG. 11 illustrates an example arrangement of an Open RAN ("O-RAN") environment in which one or more embodiments, described herein, may be implemented.

FIG. 11 illustrates an example O-RAN environment 1100, which may correspond to RAN 910, RAN 912, and/or DU network 1000. For example, RAN 910, RAN 912, and/or DU network 1000 may include one or more instances of O-RAN environment 1100, and/or one or more instances of O-RAN environment 1100 may implement RAN 910, RAN 912, DU network 1000, and/or some portion thereof. As shown, O-RAN environment 1100 may include Non-Real Time Radio Intelligent Controller ("RIC") 1101, Near-Real Time RIC 1103, O-eNB 1105, O-CU-Control Plane ("O-CU-CP") 1107, O-CU-User Plane ("O-CU-UP") 1109, O-DU 1111, O-RU 1113, and O-Cloud 1115. In some embodiments, O-RAN environment 1100 may include additional, fewer, different, and/or differently arranged components.

In some embodiments, some or all of the elements of O-RAN environment 1100 may be implemented by one or more configurable or provisionable resources, such as virtual machines, cloud computing systems, physical servers, and/or other types of configurable or provisionable resources. In some embodiments, some or all of O-RAN environment 1100 may be implemented by, and/or communicatively coupled to, one or more MECs 1007.

Non-Real Time RIC 1101 and Near-Real Time RIC 1103 may receive performance information (and/or other types of information) from one or more sources, and may configure other elements of O-RAN environment 1100 based on such performance or other information. For example, Near-Real Time RIC 1103 may receive performance information, via one or more E2 interfaces, from O-eNB 1105, O-CU-CP 1107, and/or O-CU-UP 1109, and may modify parameters associated with O-eNB 1105, O-CU-CP 1107, and/or O-CU-UP 1109 based on such performance information. Similarly, Non-Real Time RIC 1101 may receive performance information associated with O-eNB 1105, O-CU-CP 1107, O-CU-UP 1109, and/or one or more other elements of O-RAN environment 1100 and may utilize machine learning and/or other higher level computing or processing to determine modifications to the configuration of O-eNB 1105, O-CU-CP 1107, O-CU-UP 1109, and/or other elements of O-RAN environment 1100. In some embodiments, Non-Real Time RIC 1101 may generate machine learning models based on performance information associated with O-RAN environment 1100 or other sources, and may provide such models to Near-Real Time RIC 1103 for implementation.

O-eNB 1105 may perform functions similar to those described above with respect to eNB 913. For example, O-eNB 1105 may facilitate wireless communications between UE 901 and a core network. O-CU-CP 1107 may perform control plane signaling to coordinate the aggregation and/or distribution of traffic via one or more DUs 1003, which may include and/or be implemented by one or more O-DUs 1111, and O-CU-UP 1109 may perform the aggregation and/or distribution of traffic via such DUs 1003 (e.g., O-DUs 1111). O-DU 1111 may be communicatively coupled to one or more RUs 1001, which may include and/or may be implemented by one or more O-RUs 1113. In some embodiments, O-Cloud 1115 may include or be implemented by one or more MECs 1007, which may provide services, and may be communicatively coupled, to O-CU-CP 1107, O-CU-UP 1109, O-DU 1111, and/or O-RU 1113 (e.g., via an O1 and/or O2 interface).

Figure 12:
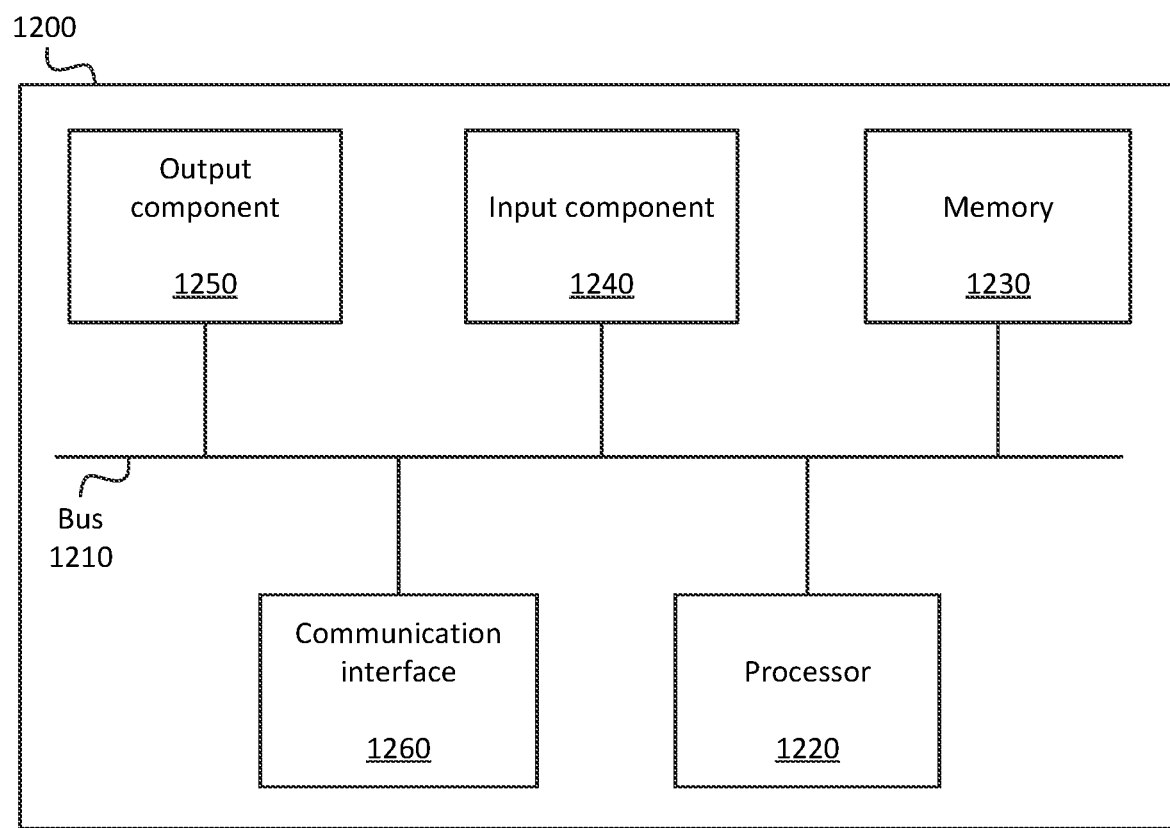
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      monitor a set of Key Performance Indicators ("KPIs") associated with one or more Virtualized Network Functions ("VNFs") implemented at a first data center;
      determine that a first VNF and a second VNF, of the one or more VNFs implemented at the first data center, do not share a communication interface that would provide for communications between the first and second VNFs;
      detect a failover event associated with the first data center based on a determination that the set of KPIs associated with the one or more VNFs do not meet a set of performance thresholds; and
      fail over the first and second VNFs to a second data center based on:
         the detecting of the failover event, and
         the determination that the first and second VNFs do not share a communication interface that would provide for communications between the first and second VNFs.

2. The device of claim 1, wherein detecting the failover event is not based on KPIs associated with the second VNF.

3. The device of claim 1,
   wherein the first VNF is at least one of:
      a Proxy Call Session Control Function ("P-CSCF"),
      an Interrogating CSCF ("I-CSCF"), or
      a Serving CSCF ("S-CSCF"),
   wherein the set of KPIs includes at least one of:
      a call success rate via the first VNF, or
      a call failure rate via the first VNF.

4. The device of claim 1, wherein the first VNF implements Diameter protocol messaging, wherein the first set of KPIs includes a quantity or proportion of Diameter errors generated by or received from the first VNF.

5. The device of claim 1, wherein the one or more processors are further configured to:
   identify a third VNF implemented at the first data center;
   determine that the first VNF and the third VNF share a particular communication interface via which the first and third VNFs communicate; and
   fail over the third VNF to the second data center based on:
      the detecting of the failover event associated with the first data center, and
      the determination that the first and third VNFs share the particular communication interface via which the first and third VNFs communicate.

6. The device of claim 5, wherein the one or more processors are further configured to:
   determine that the particular communication interface via which the first and third VNFs communicate is associated with a threshold latency; and
   determine that a latency of communications between the first data center and the second data center exceeds the threshold latency,
   wherein failing over the third VNF to the second data center is further based on the determination that the latency of communications between the first data center and the second data center exceeds the threshold latency.

7. The device of claim 1, wherein the one or more processors are further configured to:
   identify a third VNF implemented at the first data center, the third VNF being associated with a set of KPIs that meet the set of performance thresholds; and
   fail over the third VNF to the second data center, irrespective of the set of KPIs associated with the third VNF meeting the set of performance thresholds, based on the detection of the failover event associated with the first data center.

8. A non-transitory computer-readable medium, storing a plurality of processor-executable instructions to:
   monitor a set of Key Performance Indicators ("KPIs") associated with one or more Virtualized Network Functions ("VNFs") implemented at a first data center;
   determine that a first VNF and a second VNF, of the one or more VNFs implemented at the first data center, are not associated with a shared communication interface between the first and second VNFs;
   detect a failover event associated with the first data center based on a determination that the set of KPIs associated with the one or more VNFs do not meet a set of performance thresholds; and
   fail over the first and second VNFs to a second data center based on:
      the detecting of the failover event, and
      the determination that the first and second VNFs are not associated with a shared communication interface between the first and second VNFs.

9. The non-transitory computer-readable medium of claim 8, wherein detecting the failover event is not based on KPIs associated with the second VNF.

10. The non-transitory computer-readable medium of claim 8,
    wherein the first VNF is at least one of:
       a Proxy Call Session Control Function ("P-CSCF"),
       an Interrogating CSCF ("I-CSCF"), or
       a Serving CSCF ("S-CSCF"), wherein the set of KPIs includes at least one of:
a call success rate via the first VNF, or
a call failure rate via the first VNF.

11. The non-transitory computer-readable medium of claim 8, wherein the first VNF implements Diameter protocol messaging, wherein the first set of KPIs includes a quantity or proportion of Diameter errors generated by or received from the first VNF.

12. The non-transitory computer-readable medium of claim 8, wherein the plurality of processor-executable instructions further include processor-executable instructions to:
identify a third VNF implemented at the first data center;
determine that the first VNF and the third VNF are associated with a communication interface via which the first and third VNFs communicate; and
fail over the third VNF to the second data center based on:
the detecting of the failover event associated with the first data center, and
the determination that the first and third VNFs are associated with the communication interface via which the first and third VNFs communicate.

13. The non-transitory computer-readable medium of claim 12, wherein the plurality of processor-executable instructions further include processor-executable instructions to:
determine that the communication interface via which the first and third VNFs communicate is associated with a threshold latency; and
determine that a latency of communications between the first data center and the second data center exceeds the threshold latency,
wherein failing over the third VNF to the second data center is further based on the determination that the latency of communications between the first data center and the second data center exceeds the threshold latency.

14. The non-transitory computer-readable medium of claim 8, wherein the plurality of processor-executable instructions further include processor-executable instructions to:
identify a third VNF implemented at the first data center, the third VNF being associated with a set of KPIs that meet the set of performance thresholds; and
fail over the third VNF to the second data center, irrespective of the set of KPIs associated with the third VNF meeting the set of performance thresholds, based on the detection of the failover event associated with the first data center.

15. A method, comprising:
monitoring a set of Key Performance Indicators ("KPIs") associated with one or more Virtualized Network Functions ("VNFs") implemented at a first data center;
determining that a first VNF and a second VNF, of the one or more VNFs, are not associated with a predefined communication interface between the first and second VNFs;
detecting a failover event associated with the first data center based on a determination that the set of KPIs associated with the one or more VNFs do not meet a set of performance thresholds; and
failing over the first and second VNFs to a second data center based on:
the detecting of the failover event, and
the determination that the first and second VNFs are not associated with a predefined interface between the first and second VNFs.

16. The method of claim 15, wherein detecting the failover event is not based on KPIs associated with the second VNF.

17. The method of claim 15,
wherein the first VNF is at least one of:
a Proxy Call Session Control Function ("P-CSCF"),
an Interrogating CSCF ("I-CSCF"), or
a Serving CSCF ("S-CSCF"),
wherein the set of KPIs includes at least one of:
a call success rate via the first VNF, or
a call failure rate via the first VNF.

18. The method of claim 15, wherein the first VNF implements Diameter protocol messaging, wherein the first set of KPIs includes a quantity or proportion of Diameter errors generated by or received from the first VNF.

19. The method of claim 15, the further comprising:
identifying a third VNF implemented at the first data center;
determining that the first VNF and the third VNF are associated with a particular predefined communication interface via which the first and third VNFs communicate, the communication interface via which the first and third VNFs communicate being associated with a threshold latency;
determining that a latency of communications between the first data center and the second data center exceeds the threshold latency; and
failing over the third VNF to the second data center based on:
the detecting of the failover event associated with the first data center,
the determination that the first and third VNFs are associated with the particular predefined communication interface via which the first and third VNFs communicate, and
the determination that the latency of communications between the first data center and the second data center exceeds the threshold latency.

20. The method of claim 15, further comprising:
identifying a third VNF implemented at the first data center, the third VNF being associated with a set of KPIs that meet the set of performance thresholds; and
failing over the third VNF to the second data center, irrespective of the set of KPIs associated with the third VNF meeting the set of performance thresholds, based on the detection of the failover event associated with the first data center.

* * * * *